(12) United States Patent
Jiang

(10) Patent No.: US 12,510,759 B2
(45) Date of Patent: Dec. 30, 2025

(54) OPTICAL SYSTEM

(71) Applicant: AAC OPTICS (CHANGZHOU) CO., LTD., Changzhou (CN)

(72) Inventor: Siyuan Jiang, Changzhou (CN)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 433 days.

(21) Appl. No.: 18/327,011

(22) Filed: May 31, 2023

(65) Prior Publication Data

US 2024/0248316 A1 Jul. 25, 2024

(30) Foreign Application Priority Data

Jan. 20, 2023 (CN) .......................... 202310075205.5

(51) Int. Cl.
*G02B 27/09* (2006.01)
*G02B 5/30* (2006.01)
*G02B 27/01* (2006.01)
*G02B 27/14* (2006.01)

(52) U.S. Cl.
CPC ....... *G02B 27/0955* (2013.01); *G02B 5/3033* (2013.01); *G02B 5/3083* (2013.01); *G02B 27/0172* (2013.01); *G02B 27/142* (2013.01)

(58) Field of Classification Search
CPC .............. G02B 27/0955; G02B 5/3033; G02B 5/3083; G02B 27/0172; G02B 27/142; G02B 13/0035; G02B 2027/0112; G02B 27/286
See application file for complete search history.

(56) References Cited

U.S. PATENT DOCUMENTS

| 2009/0040602 A1* | 2/2009 | Spilman .............. G03F 7/70566 359/486.01 |
| 2023/0324660 A1* | 10/2023 | Pretorius .............. G02B 21/361 359/368 |

* cited by examiner

*Primary Examiner* — Mariam Qureshi
(74) *Attorney, Agent, or Firm* — Wiersch Law Group

(57) ABSTRACT

The present disclosure relates to the technical field of near-to-eye display and discloses an optical system including, from an anterior side to a posterior side: an image surface, a circular polarizer; a third lens, a beam splitter, a second lens, a quarter waveplate, a first lens, a reflective polarizing film and an aperture, wherein the circular polarizer is attached to a posterior side of the image surface, the beam splitter is attached to an anterior-side surface of the second lens, the first lens and the second lens are glued together, the quarter waveplate is provided between the first lens and the second lens, the reflective polarizing film is attached to a posterior-side surface of the first lens, satisfying following conditions: VD≥16.00 mm, SDmax≤30.00 mm, L≤15.00 mm and f12/f≤1.00. The optical system has good optical functions while satisfying a desire of design in a small size and a light weight.

13 Claims, 9 Drawing Sheets

OPTICAL SYSTEM

TECHNICAL FIELD

The present disclosure relates to the technical field of near-to-eye display, in particular, to an optical system.

BACKGROUND

With rapid development of the technology related to intelligent headwear devices this year, application of electronic devices equipped with optical lenses has become more widespread, and desires for the optical lenses have become more diverse. Application of optical lenses is growing fast in areas such as virtual reality, augmented reality and hybrid reality. Based on user experience, there is an urgent demand for an optical system having both a small size and an excellent imaging method.

SUMMARY

With regard to the above issues, the objective of the present disclosure is to provide an optical system that has good optical functions while satisfying the desire of design in a small size and a light weight.

In order to address the above issues, embodiments of the present disclosure provide an optical system, from an anterior side to a posterior side: an image surface to emit light, a circular polarizer; a third lens, a beam splitter, a second lens, a quarter waveplate, a first lens, a reflective polarizing film and an aperture, wherein the circular polarizer is attached to a posterior side of the image surface, the beam splitter is attached to an anterior-side surface of the second lens, the first lens and the second lens are glued together, the quarter waveplate is provided between the first lens and the second lens, the reflective polarizing film is attached to a posterior-side surface of the first lens, and the optical system satisfies following conditions: $VD \geq 16.00$ mm, $SDmax \leq 30.00$ mm, $L \leq 15.00$ mm and $f12/f \leq 1.00$; where VD denotes a maximum visible diameter of the optical system, SDmax denotes a maximum effective radius of each lens in the optical system, L denotes an exit pupil distance of the optical system, f12 denotes a combined focal length of the first lens and the second lens, and f denotes a focal length of the optical system.

As an improvement, a gluing surface of the first lens and the second lens is a plane surface.

As an improvement, all of the posterior-side surface of the first lens, the anterior-side surface of the second lens, an anterior-side surface of the third lens and a posterior-side surface of the third lens are aspherical surfaces.

As an improvement, the beam splitter is a transflective film, and the optical system satisfies following condition: $45.00\% \leq X \leq 65.00\%$; where X denotes a reflective rate.

As an improvement, the optical system satisfies following condition: $85.00° \leq FOV \leq 95.00°$; where FOV denotes a field of view of the optical system.

As an improvement, the optical system satisfies following condition: $TTL \leq 15.00$ mm; where TTL denotes an on-axis distance from an anterior-side surface of the third lens to the posterior-side surface of the first lens.

As an improvement, a transmissive rate of a transmissive axis of the reflective polarizing film is greater than or equal to 91.00%, while a reflective rate of a reflective axis of the reflective polarizing film is greater than or equal to 98.00%.

As an improvement, the optical system satisfies following condition: $|DIST| \leq 30.00\%$; where DIST denotes an optical distortion of the optical system.

As an improvement, the optical system satisfies following condition: $Lc \leq 30.00$ m; where Lc denotes a chromatic aberration of the optical system.

As an improvement, the optical system satisfies following condition: $RM \leq 30.00$ m; where RM denotes a maximum value of a mean square root radius within a maximum visible diameter.

As an improvement, the optical system satisfies following condition: $CAR \leq 25.00°$; where CAR denotes a chief ray angle of the optical system.

As an improvement, the optical system satisfies following condition: $TTL/f \leq 1.00$; where TTL denotes an on-axis distance from the anterior-side surface of the third lens to the posterior-side surface of the first lens; and f denotes a focal length of the optical system.

As an improvement, the image surface is a display having a size of 1.3 inches.

The present disclosure is advantageous in: by gluing the first lens and the second lens, attaching the beam splitter to the anterior-side surface of the second lens, providing the quarter waveplate between the first lens and the second lens, attaching the reflective polarizing film to the posterior-side surface of the first lens, a pancake-lens structure is achieved, a semi-diameter of a lens is controlled, and a size of the optical system is reduced. Besides, the maximum visible diameter is greater than or equal to 16 mm, so that an optimal display can be achieved by a user without complicated adjustment. In addition, the optical system has a small size but excellent imaging functions.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
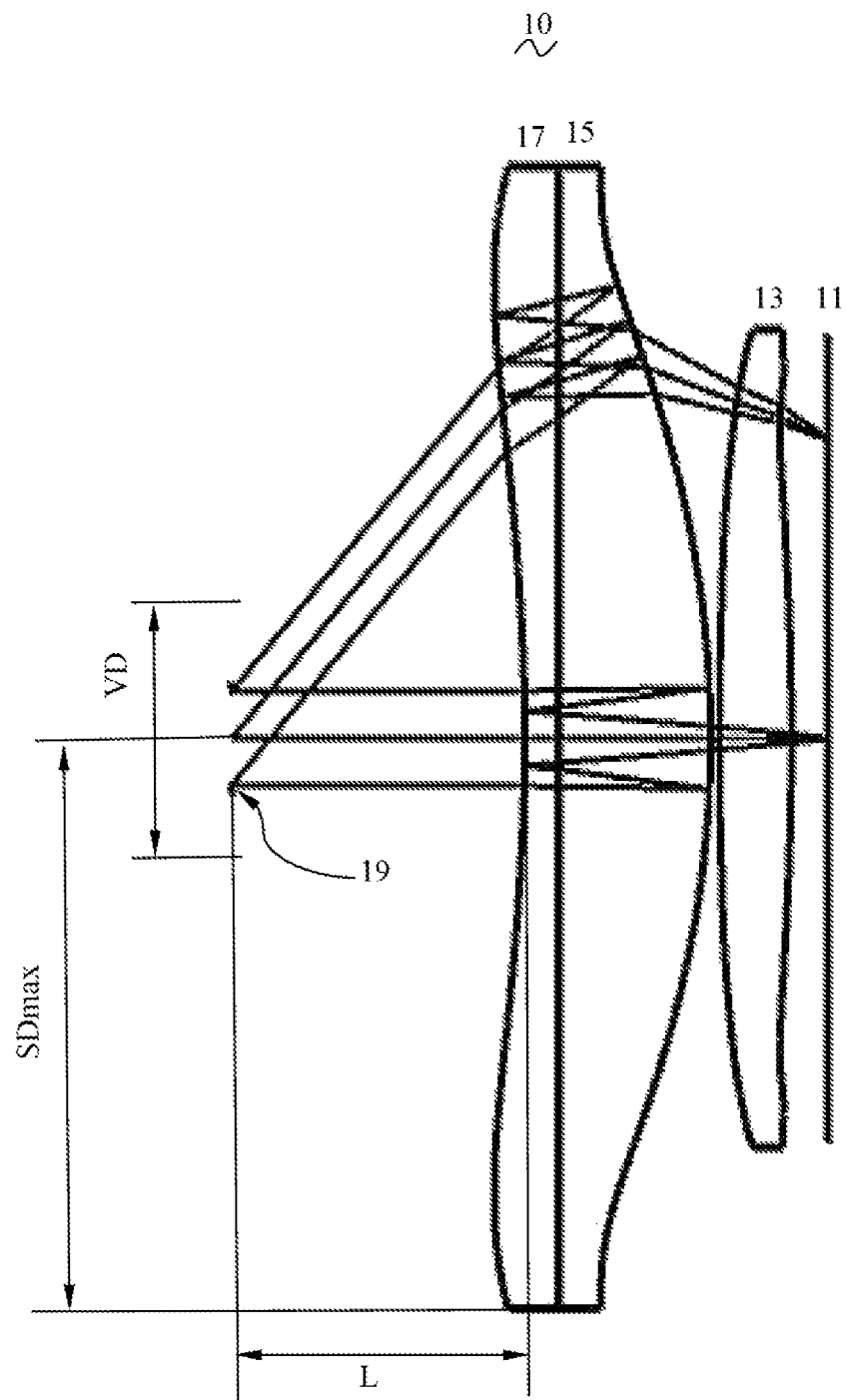
FIG. 1 is a schematic diagram of a structure of an optical system according to Embodiment 1 of the present disclosure.
Figure 5:
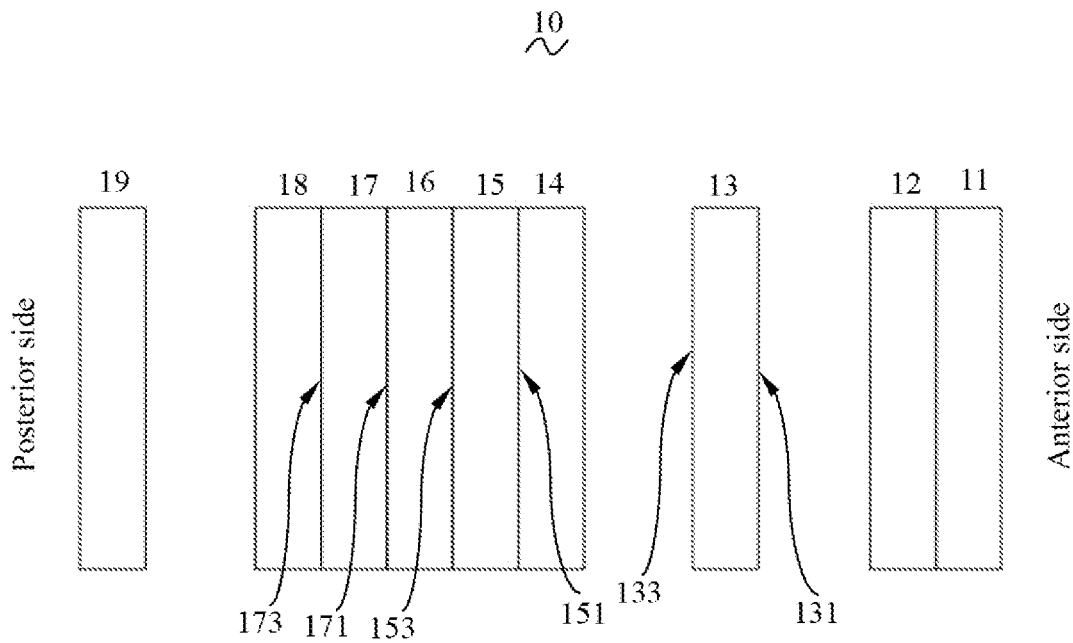
FIG. 5 is a schematic diagram of the optical system shown in FIG. 1 including a film structure.

With reference to FIG. 1 and FIG. 5, the present disclosure provides an optical system 10 including, from an anterior side to a posterior side: an image surface 11 to emit light, a circular polarizer 12; a third lens 13, a beam splitter 14, a second lens 15, a quarter waveplate 16, a first lens 17, a reflective polarizing film 18 and an aperture 19.

The circular polarizer 12 is attached to a posterior side of the image surface 11. In this embodiment, the image surface 11 is a display having a size of 1.3 inches. After light emitted by the display passes through the circular polarizer 12, a left-hand circular polarization (LCP) light is formed. The LCP light passes through and is refracted by the third lens 13, and is then emitted to the beam splitter 14.

The beam splitter 14 is attached to an anterior-side surface 151 of the second lens 15. Partial LCP light emitted to the beam splitter 14 is reflected by the beam splitter 14, and partial light is emitted to the second lens 15. Herein, the light emitted to the second lens 15 is still LCP light.

The first lens 17 and the second lens 15 are glued together. By gluing, a size of an entire optical module may be reduced. In addition, by gluing, two lenses form an integral structure. When assembling the optical module, installation of the two lenses may be completed through one placement.

In this embodiment, the gluing surface of the first lens 17 and the second lens 15 is a plane surface. That is, both an anterior-side surface 171 of the first lens 17 and a posterior-side surface 153 of the second lens 15 are plane surfaces.

The quarter waveplate 16 is provided between the first lens 17 and the second lens 15. The LCP light emitted to the second lens 15 is refracted by the second lens 15 and is then emitted to the quarter waveplate 16. The LCP light is converted to a linearly polarized light S after passing through the quarter waveplate 16 for a first time. The linearly polarized light S is refracted by the first lens 17, emitted to the reflective polarizing film 18, reflected to the first lens 17 at the reflective polarizing film 18, refracted by the first lens 17, and then emitted to the quarter waveplate 16. At this time, the light is still a linearly polarized light S. The light is converted to the LCP light after passing through the quarter waveplate 16 for a second time, and is then emitted to the second lens 15 for a second time. The light is refracted by the second lens 15 and is emitted to the beam splitter 14 where the light is partially reflected. A reflected light is converted to a right-hand circular polarization (RCP) light and is emitted to the second lens 15 for a third time. The light is refracted by the second lens 15 and emitted to the quarter waveplate 16. Through the quarter waveplate 16, the light is converted to a linearly polarized light P and emitted to the first lens 17. The light is refracted by the first lens 17 and emitted to the reflective polarizing film 18. Because the reflective polarizing film 18 has characteristics of reflecting the linearly polarized light S and transmitting the linearly polarized light P, the linearly polarized light P is transmitted by the reflective polarizing film 18 to enter the aperture 19.

A position of the aperture 19 is a position of a simulated human-eye surface. A diameter EPD of the aperture 19 is 4.00 mm. A maximum visible diameter of the optical system 10 is defined as VD, and VD=EPD+EYESHIFT*2. Herein, EYESHIFT=eyeball diameter*sin (a rotation angle of an eye). When the eyeball diameter=12 mm, the rotation angle of an eye=30°, EYESHIFT=6 mm and VD is 16.00 mm, the optical system satisfies VD≥16.00 mm. That is, human eyes are able to see a clear image when moving within a scope of at least 16.00 mm of a diameter, so that a user is able to see an optimal display at an optimal position without frequent adjustment. FOV is increased so that FOV may be greater than 90°.

A maximum effective radius of each lens in the optical system 10 is defined as SDmax. In this embodiment, an effective radius of the first lens 17 is 24.00 mm, an effective radius of the second lens 15 is 24.00 mm, and an effective radius of the third lens 13 is 17.20 mm, all satisfying a condition of SDmax≤30.00 mm, and facilitating reducing a size of the optical system 10.

An exit pupil distance (a distance from an apex of a posterior-side surface 173 of the first lens 17 of the optical system to an intersection point between an exit pupil plane and an optical axis) of the optical system 10 is defined as L. In this embodiment, L is 15.00 mm, and the optical system satisfies a condition of L≤15.00 mm.

A combined focal length of the first lens 17 and the second lens 15 is defined as f12, a focal length of the optical system 10 is defined as f. In this embodiment, f12 is 12.370 mm, f is 17.708 mm, f12/f is 0.699, and the optical system satisfies a condition of f12/f≤1.00.

In this embodiment, all of the posterior-side surface 173 of the first lens 17, the anterior-side surface 151 of the second lens 15, an anterior-side surface 131 of the third lens 13 and a posterior-side surface 133 of the third lens 13 are aspherical surfaces. Through the aspheric-surface design of the first lens 17 and the second lens 15, a focus position of a displayed image may be adjusted to reduce a chromatic aberration and a distortion of the displayed image, so as to improve imaging quality. Application of an aspheric surface to the third lens 13 facilitates correcting aberration of the optical system. In an alternative embodiment, a free curved surface may be employed.

In this embodiment, the posterior-side surface 173 of the first lens 17 is a concave surface, the anterior-side surface 151 of the second lens 15 is a convex surface, the anterior-side surface 131 of the third lens 13 is a convex surface and the posterior-side surface 133 of the third lens 13 is a concave surface.

In this embodiment, the beam splitter 14 is a transflective film, a reflective rate is defined as X, and the optical system 10 satisfies a condition of 45.00%≤X≤65.00%. A ratio of a reflective rate and a transmissive rate of the beam splitter 14 may be adjusted as specifically desired for design.

A field of view of the optical system 10 is defined as FOV. In this embodiment, FOV is 89.73°, and the optical system 10 satisfies a condition of 85.00°≤FOV≤95.00°. A greater field of view brings about a better user experience.

A total optical length (an on-axis distance from the anterior-side surface 131 of the third lens 13 to the posterior-side surface 173 of the first lens 17) of the optical system 10 is defined as TTL. In this embodiment, TTL is 13.609 mm, and the optical system satisfies a condition of TTL≤15.00 mm, facilitating reducing the size of the optical system.

In this embodiment, a transmissive rate of a transmissive axis of the reflective polarizing film 18 is greater than or equal to 91.00%, while a reflective rate of a reflective axis of the reflective polarizing film 18 is greater than or equal to 98.00%. A higher reflective rate improves light efficiency of the optical system 10 and increases a display luminance.

An optical distortion of the optical system is defined as DIST. In this embodiment, the DIST is −29.50%, and the optical system 10 satisfies a condition of |DIST|≤30.00%. The distortion is small, providing a VR environment that is more realistic.

A chromatic aberration of the optical system 10 is defined as Lc. In this embodiment, Lc is 15.14 μm, and the optical system 10 satisfies a condition of Lc≤30.00 μm.

A maximum value of a mean square root radius within a maximum visible diameter of the optical system 10 is defined as RM. In this embodiment, RM is 19.200 μm, and the optical system 10 satisfies a condition of RM≤30.00 μm. It shall be noted that RM corresponds to rotation angles of an eye in a one-to-one correspondence. For example, when a rotation angle is 30°, RM is a maximum value of a mean square root radius of an image obtained when the eye rotates by 30°. In this embodiment, the maximum value is 19.200 μm. When a rotation angle is 0°, RM is a maximum value of a mean square root radius of an image obtained when the eye is right opposite an optical axis of a lens. In this embodiment, the maximum value is 1.873 μm. In this embodiment, the maximum value is obtained when the rotation angle of the eye is 30°. In an alternative embodiment, the maximum value may be a mean square root radius of another angle within the rotation angle of 30°, and preferably, RM≤20.00 μm. During design of the optical system 10, an optical function of a position corresponding to a rotation angle of the eye is controlled. Herein, a design is closer to a real feeling of a user. An optimal visual function may be obtained as long as the eye is within the VD scope. Therefore, a user experience is improved.

A chief ray angle of the optical system is defined as CAR. In this embodiment, CAR is 24.51°, and the optical system 10 satisfies a condition of CAR≤25.00°.

A focal length of the optical system 10 is defined as f. In this embodiment, TTL is 13.609 mm, f is 17.708 mm, TTL/f is 0.769, and the optical system 10 satisfies a condition of TTL/f≤1.00, facilitating reducing the size of the optical system 10.

In the following, examples will be used to describe the optical system 10 of the present disclosure. The symbols recorded in each example will be described as follows. The focal length, on-axis distance, central curvature radius, on-axis thickness, inflexion point position, and arrest point position are all in units of mm.

Design data of the optical system 10 in Embodiment 1 of the present disclosure are shown in Table 1 and Table 2.

TABLE 1

|  | R |  | d | nd |  | vd |
| --- | --- | --- | --- | --- | --- | --- |
| Apeture | ∞ | d0= | 15.000 |  |  |  |
| R1 | −66.141 | d1= | 1.709 | 1.658 | n1 | 21.002678 v1 |
| R2 | ∞ | d2= | 0.050 | 1.544 | n2 | 56.276843 v2 |
| R3 | ∞ | d3= | 7.732 | 1.544 | n3 | 56.276843 v3 |
| R4 | −36.098 | d4= | −7.732 | 1.544 | n3 | 56.276843 v3 |
| R3 | ∞ | d5= | −0.050 | 1.544 | n2 | 56.276843 v2 |
| R2 | ∞ | d6= | −1.709 | 1.658 | n1 | 21.002678 v1 |
| R1 | −66.141 | d1= | 1.709 | 1.658 | n1 | 21.002678 v1 |
| R2 | ∞ | d2= | 0.050 | 1.544 | n2 | 56.276843 v2 |
| R3 | ∞ | d3= | 7.732 | 1.544 | n3 | 56.276843 v3 |
| R4 | −36.098 | d7= | 0.451 |  |  |  |
| R5 | −25317.737 | d8= | 3.667 | 1.658 | n4 | 21.002678 v4 |
| R6 | −127.332 | d9= | 1.877 |  |  |  |
| Image Surface | ∞ |  |  |  |  |  |

In the table, meanings of various symbols will be described as follows.

R: curvature radius at a center of an optical surface;

R1: central curvature radius of a posterior-side surface 173 of the first lens 17;

R2: central curvature radius of an anterior-side surface 171 of the first lens 17;

R3: central curvature radius of a posterior-side surface 153 of the second lens 15;

R4: central curvature radius of an anterior-side surface 151 of the second lens 15;

R5: central curvature radius of a posterior-side surface 133 of the third lens 13;

R6: central curvature radius of an anterior-side surface 131 of the third lens 13;

d: on-axis thickness of a lens and an on-axis distance between lenses (in order to facilitate understanding an optical path, a light going from a posterior side to an anterior side is set with a positive value, while a light going from an anterior side to a posterior side is set with a negative value);

d0: on-axis distance from the aperture 19 to the posterior-side surface 173 of the first lens 17;

d1: on-axis thickness of the first lens 17;

d2: on-axis distance from the anterior-side surface 171 of the first lens 17 to the posterior-side surface 153 of the second lens 15;

d3: on-axis thickness of the second lens 15;

d4: a negative value of the on-axis thickness of the second lens 15;

d5: a negative value of the on-axis distance from the anterior-side surface 171 of the first lens 17 to the posterior-side surface 153 of the second lens 15;

d6: negative value of an on-axis distance of the first lens 17;

d7: on-axis distance from the anterior-side surface 151 of the second lens 15 to a posterior-side surface 133 of the third lens 13;

d8: on-axis thickness of the third lens 13;

d9: on-axis distance from the anterior-side surface 131 of the third lens 13 to the image surface 11;

nd: refractive index of a d line;

n1: refractive index of the d line of the first lens 17;

n2: refractive index of the d line of the quarter waveplate 16;

n3: refractive index of the d line of the second lens 15;

n4: refractive index of the d line of the third lens 13;

vd: abbe number;

v1: abbe number of the first lens 17;

v2: abbe number of the quarter waveplate 16;

v3: abbe number of the second lens 15;
v4: abbe number of the third lens 13.

Table 2 shows aspherical surface data of lenses in the optical system 10 in Embodiment 1 of the present disclosure.

(a vertical distance between a point on the aspheric surface which is of the distance of r from the optical axis, and a tangent surface that is tangent with a top point of the optical axis of the aspheric surface).

TABLE 2

| | Conic coefficient | Aspheric surface coefficients | | | | |
|---|---|---|---|---|---|---|
| | k | A4 | A6 | A8 | A10 | A12 |
| R1 | −2.4255E+01 | 2.3526E−06 | 1.9088E−07 | −4.3668E−09 | 4.2879E−11 | −2.4478E−13 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8202E+00 | −4.3840E−06 | 7.7079E−08 | −1.2972E−09 | 1.2846E−11 | −8.8461E−14 |
| R3 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R1 | −2.4255E+01 | 2.3526E−06 | 1.9088E−07 | −4.3668E−09 | 4.2879E−11 | −2.4478E−13 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8202E+00 | −4.3840E−06 | 7.7079E−08 | −1.2972E−09 | 1.2846E−11 | −8.8461E−14 |
| R5 | −8.4259E+01 | 3.0616E−04 | −1.1063E−05 | 1.9924E−07 | −2.0475E−09 | 1.3004E−11 |
| R6 | 4.4755E+01 | 1.9656E−05 | −2.3669E−06 | 7.4835E−08 | −1.1419E−09 | 1.0092E−11 |

| | Conic coefficient | Aspheric surface coefficients | | | | |
|---|---|---|---|---|---|---|
| | k | A14 | A16 | A18 | A20 | A22 |
| R1 | −2.4255E+01 | 9.0439E−16 | −2.2367E−18 | 3.6848E−21 | −3.8819E−24 | 2.3646E−27 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8202E+00 | 4.2863E−16 | −1.4217E−18 | 3.1324E−21 | −4.3605E−24 | 3.4632E−27 |
| R3 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R1 | −2.4255E+01 | 9.0439E−16 | −2.2367E−18 | 3.6848E−21 | −3.8819E−24 | 2.3646E−27 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8202E+00 | 4.2863E−16 | −1.4217E−18 | 3.1324E−21 | −4.3605E−24 | 3.4632E−27 |
| R5 | −8.4259E+01 | −5.2762E−14 | 1.3531E−16 | −2.0253E−19 | 1.3586E−22 | 1.4478E−29 |
| R6 | 4.4755E+01 | −5.4931E−14 | 1.8389E−16 | −3.4888E−19 | 2.8656E−22 | −2.3768E−29 |

| | Conic coefficient k | Aspheric surface coefficients A24 |
|---|---|---|
| R1 | −2.4255E+01 | −6.3282E−31 |
| R2 | 0.0000E+00 | 0.0000E+00 |
| R3 | 0.0000E+00 | 0.0000E+00 |
| R4 | −2.8202E+00 | −1.1957E−30 |
| R3 | 0.0000E+00 | 0.0000E+00 |
| R2 | 0.0000E+00 | 0.0000E+00 |
| R1 | −2.4255E+01 | −6.3282E−31 |
| R2 | 0.0000E+00 | 0.0000E+00 |
| R3 | 0.0000E+00 | 0.0000E+00 |
| R4 | −2.8202E+00 | −1.1957E−30 |
| R5 | −8.4259E+01 | 3.9623E−32 |
| R6 | 4.4755E+01 | −2.2232E−31 |

For convenience, an aspheric surface of each lens surface is an aspheric surface shown in the below formula (1). However, the present disclosure is not limited to the aspherical polynomials as shown in the formula (1).

$$z = (cr^2)/\{1 + [1 - (k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} + A22r^{22} + A24r^{24} \quad (1)$$

Figure 2:
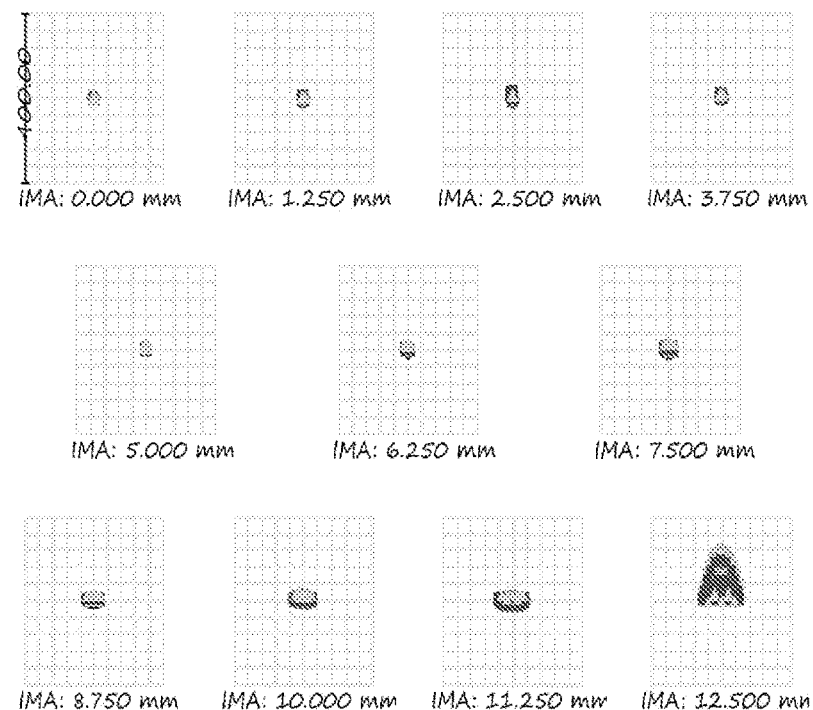
FIG. 2 is a spot diagram of the optical system shown in FIG. 1.
Figure 3:
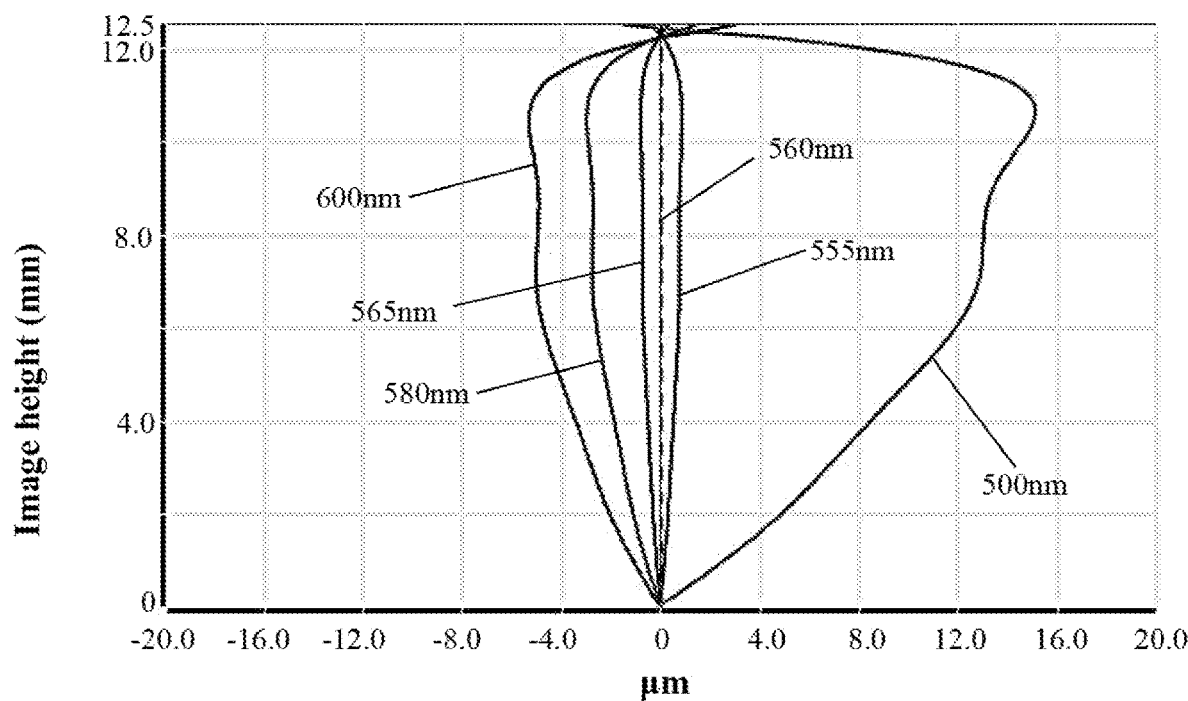
FIG. 3 is a schematic diagram of a lateral color of the optical system shown in FIG. 1.
Figure 4:
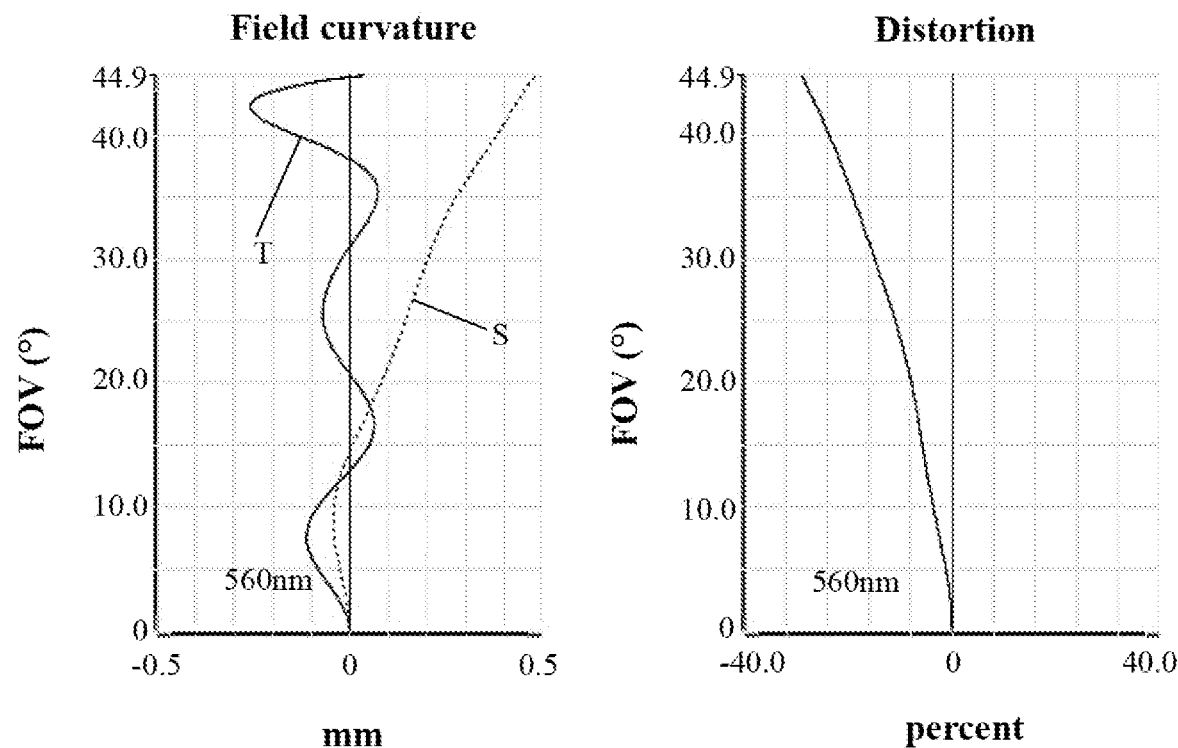
FIG. 4 is a schematic diagram of a field curvature and a distortion of the optical system shown in FIG. 1.

Herein, k is a conic coefficient, A4, A6, A8, A10, A12, A14, A16, A18, A20, A22, and A24 are aspheric surface coefficients, c is a curvature at a center of the optical surface, r is a vertical distance from a point on an aspheric surface curve to the optical axis, and z is an aspheric surface depth FIG. 2 and FIG. 3 illustrate a spot diagram and a lateral color diagram of lights having wavelengths of 500 nm, 555 nm, 560 nm, 565 nm, 580 nm and 600 nm after passing the optical system 10 according to Embodiment 1, respectively. FIG. 4 illustrates a field curvature and a distortion of a light having a wavelength of 560 nm after passing the optical system 10 according to Embodiment 1. A field curvature S in FIG. 4 is a field curvature in a sagittal direction, and T is a field curvature in a tangential direction.

In this embodiment, the focal length f1 of the first lens 17 is −99.831 mm, the focal length f2 of the second lens 15 is 66.169 mm, and the focal length f3 of the third lens 13 is 192.992 mm. An entrance pupil diameter ENPD of the optical system 10 is 4.000 mm, an image height IH of 1.0H is 12.500 mm, and an FOV (field of view) in a diagonal direction is 89.73°. Thus, the optical system 10 satisfies a desire of design in a small size and a maximum visible diameter greater than or equal to 16.00 mm. Its on-axis and off-axis aberrations are fully corrected, thereby achieving excellent optical characteristics.

Embodiment 2

Figure 6:
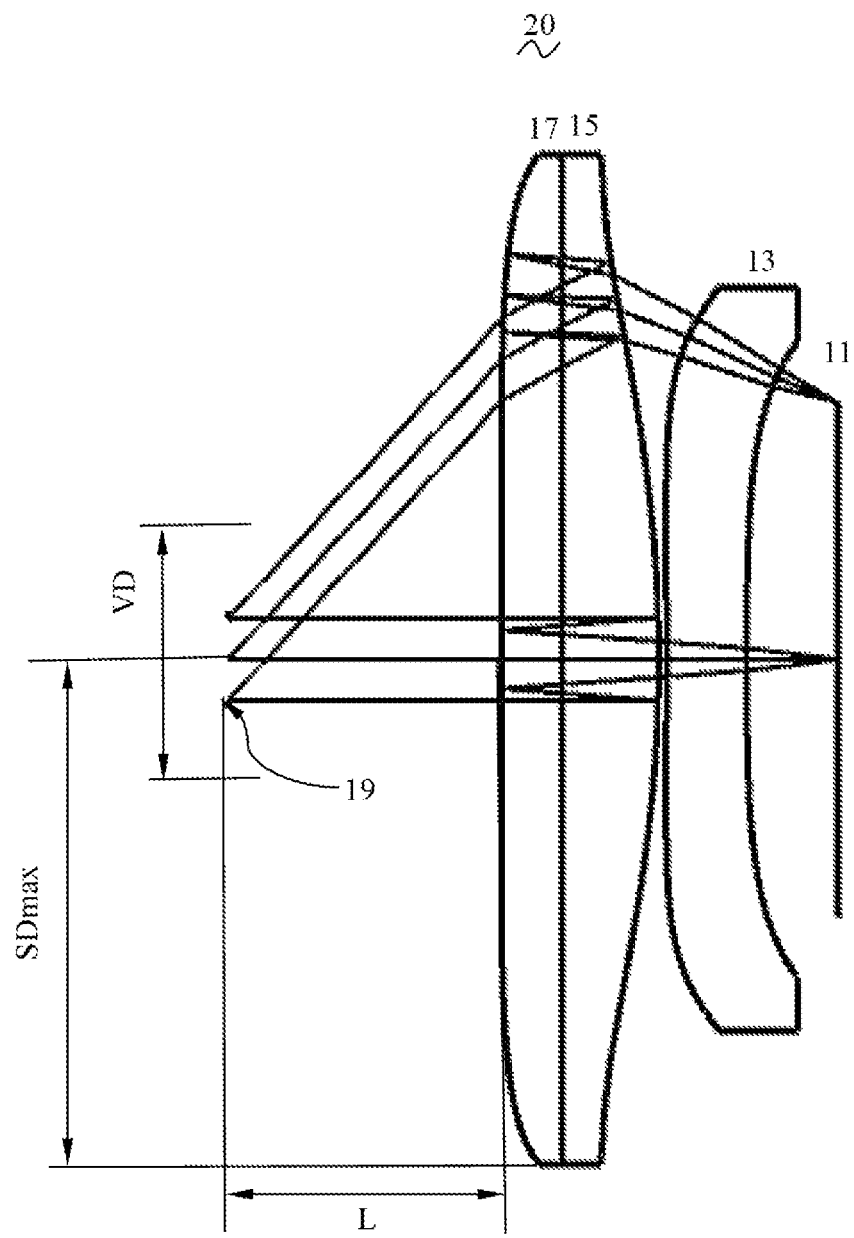
FIG. 6 is a schematic diagram of a structure of an optical system according to Embodiment 2 of the present disclosure.
Figure 10:
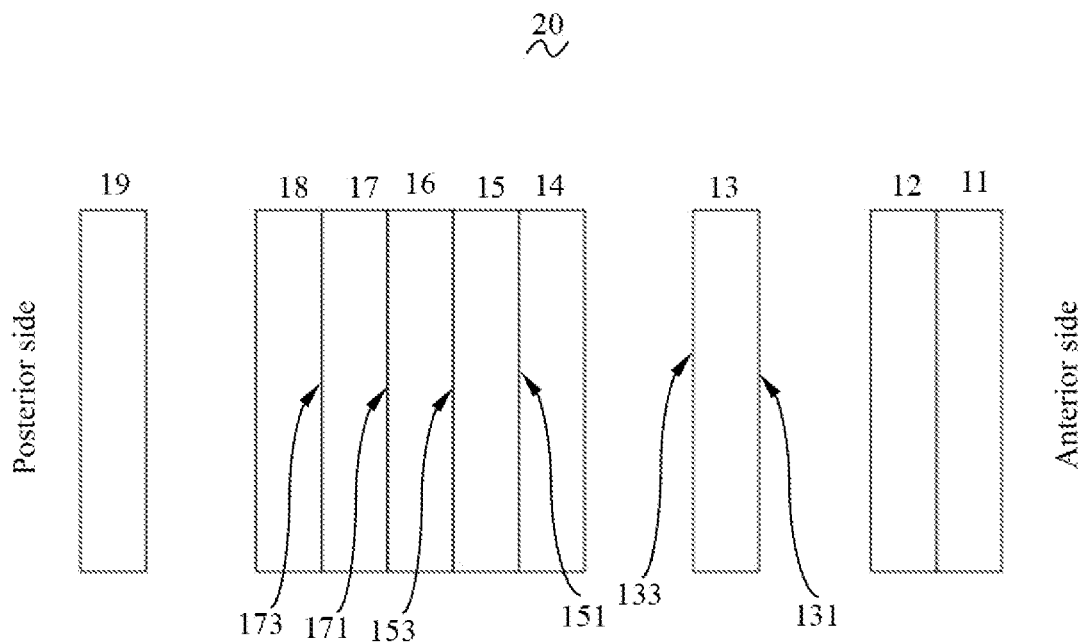
FIG. 10 is a schematic diagram of the optical system shown in FIG. 6 including a film structure.

FIG. 6 is shows an optical system 20 according to Embodiment 2 of the present disclosure. FIG. 10 is a schematic diagram of the optical system shown in FIG. 6 including a film structure. Embodiment 2 is basically the same as Embodiment 1 and involves symbols having the same meanings as Embodiment 1, and only differences therebetween will be described in the following.

In this embodiment, the anterior-side surface 131 of the third lens 13 is a concave surface.

Table 3 and Table 4 show design data of the optical system 20 in Embodiment 2 of the present disclosure.

TABLE 3

|  | R | d |  | nd |  | vd |
|---|---|---|---|---|---|---|
| Aperture | ∞ | d0= | 15.000 |  |  |  |
| R1 | −537.201 | d1= | 3.267 | n1 | 1.658 | v1 | 21.002678 |
| R2 | ∞ | d2= | 0.050 | n2 | 1.544 | v2 | 56.276843 |
| R3 | ∞ | d3= | 5.340 | n3 | 1.544 | v3 | 56.276843 |
| R4 | −59.763 | d4= | −5.340 | n3 | 1.544 | v3 | 56.276843 |
| R3 | ∞ | d5= | −0.050 | n2 | 1.544 | v2 | 56.276843 |
| R2 | ∞ | d6= | −3.267 | n1 | 1.658 | v1 | 21.002678 |
| R1 | −537.201 | d1= | 3.267 | n1 | 1.658 | v1 | 21.002678 |
| R2 | ∞ | d2= | 0.050 | n2 | 1.544 | v2 | 56.276843 |
| R3 | ∞ | d3= | 5.340 | n3 | 1.544 | v3 | 56.276843 |
| R4 | −59.763 | d7= | 0.416 |  |  |  |
| R5 | −546.837 | d8= | 4.404 | n4 | 1.658 | v4 | 21.002678 |
| R6 | 327.967 | d9= | 5.029 |  |  |  |
| Image Surface | ∞ |  |  |  |  |  |

Table 4 shows aspherical surface data of lenses in the optical system 20 in Embodiment 2 of the present disclosure.

TABLE 4

|  | Conic coefficient | Aspheric surface coefficients | | | | |
|---|---|---|---|---|---|---|
|  | k | A4 | A6 | A8 | A10 | A12 |
| R1 | −9.6118E+01 | 4.5159E−06 | −1.4847E−09 | 3.8718E−13 | 5.1423E−15 | 9.4712E−18 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −1.7679E+00 | 1.4052E−06 | 4.4332E−09 | −2.0562E−12 | 4.4643E−15 | 1.1785E−17 |
| R3 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R1 | −9.6118E+01 | 4.5159E−06 | −1.4847E−09 | 3.8718E−13 | 5.1423E−15 | 9.4712E−18 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −1.7679E+00 | 1.4052E−06 | 4.4332E−09 | −2.0562E−12 | 4.4643E−15 | 1.1785E−17 |
| R5 | −9.7828E+01 | 7.4427E−06 | 3.4895E−08 | 4.9388E−11 | 1.8340E−13 | 5.6302E−16 |
| R6 | −9.9000E+01 | 3.0881E−05 | 5.2323E−08 | −2.9268E−10 | −9.6227E−14 | 1.0033E−14 |

|  | Conic coefficient | Aspheric surface coefficients | | | | |
|---|---|---|---|---|---|---|
|  | k | A14 | A16 | A18 | A20 | A22 |
| R1 | −9.6118E+01 | 6.0291E−21 | −3.0806E−23 | −9.2151E−27 | 3.5460E−29 | 1.3567E−31 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −1.7679E+00 | 1.0344E−20 | 2.9704E−25 | −1.8787E−26 | −7.6520E−29 | −1.5846E−32 |
| R3 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R1 | −9.6118E+01 | 6.0291E−21 | −3.0806E−23 | −9.2151E−27 | 3.5460E−29 | 1.3567E−31 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −1.7679E+00 | 1.0344E−20 | 2.9704E−25 | −1.8787E−26 | −7.6520E−29 | −1.5846E−32 |
| R5 | −9.7828E+01 | 6.5270E−19 | −1.2468E−21 | −1.7225E−23 | −1.9094E−26 | 1.9729E−29 |
| R6 | −9.9000E+01 | −8.2119E−18 | −2.3082E−20 | −1.9948E−22 | −1.0056E−24 | 5.6174E−27 |

|  | Conic coefficient k | Aspheric surface coefficients A24 |
|---|---|---|
| R1 | −9.6118E+01 | 0.0000E+00 |
| R2 | 0.0000E+00 | 0.0000E+00 |
| R3 | 0.0000E+00 | 0.0000E+00 |
| R4 | −1.7679E+00 | 0.0000E+00 |
| R3 | 0.0000E+00 | 0.0000E+00 |
| R2 | 0.0000E+00 | 0.0000E+00 |
| R1 | −9.6118E+01 | 0.0000E+00 |
| R2 | 0.0000E+00 | 0.0000E+00 |
| R3 | 0.0000E+00 | 0.0000E+00 |
| R4 | −1.7679E+00 | 0.0000E+00 |
| R5 | −9.7828E+01 | 0.0000E+00 |
| R6 | −9.9000E+01 | 0.0000E+00 |

Figure 7:
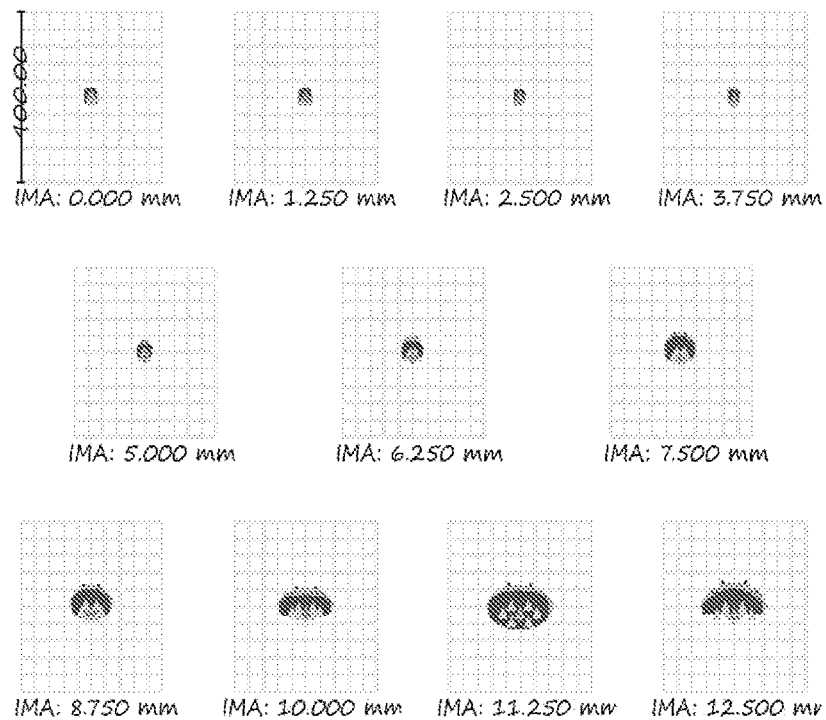
FIG. 7 is a spot diagram of the optical system shown in FIG. 6.
Figure 8:
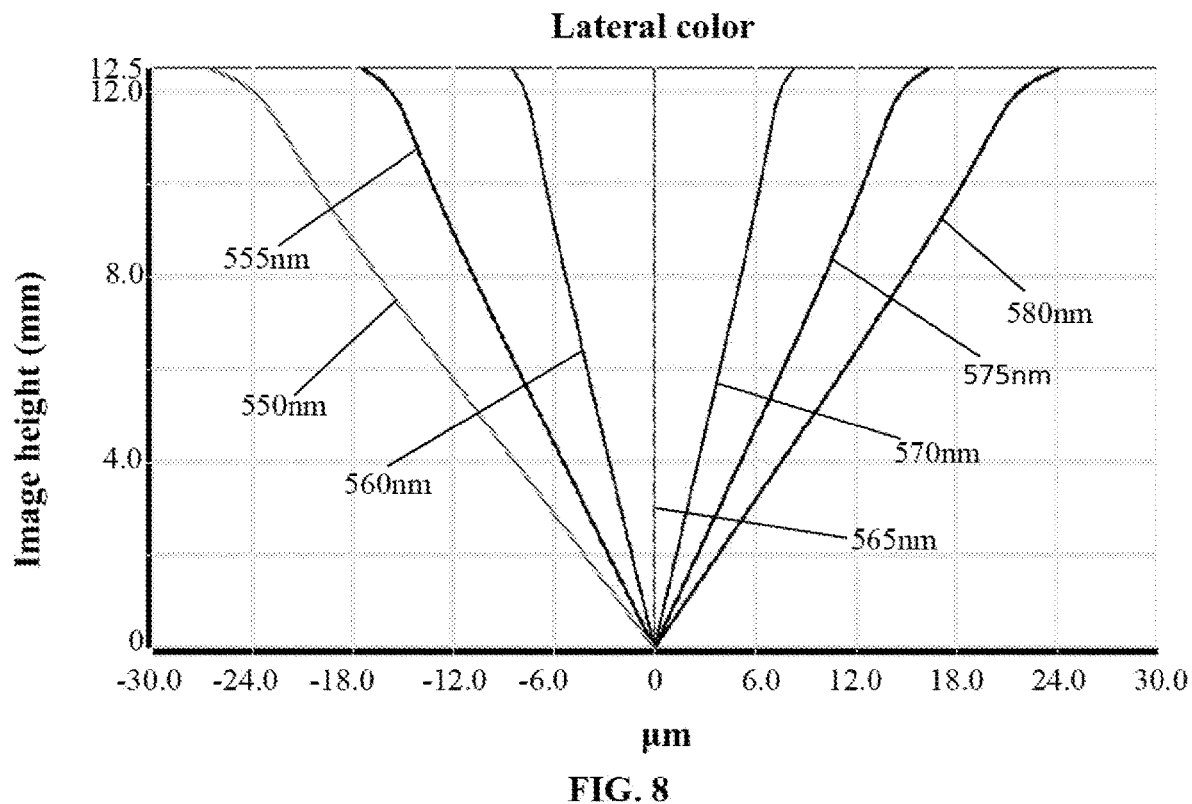
FIG. 8 is a schematic diagram of a lateral color of the optical system shown in FIG. 6.
Figure 9:
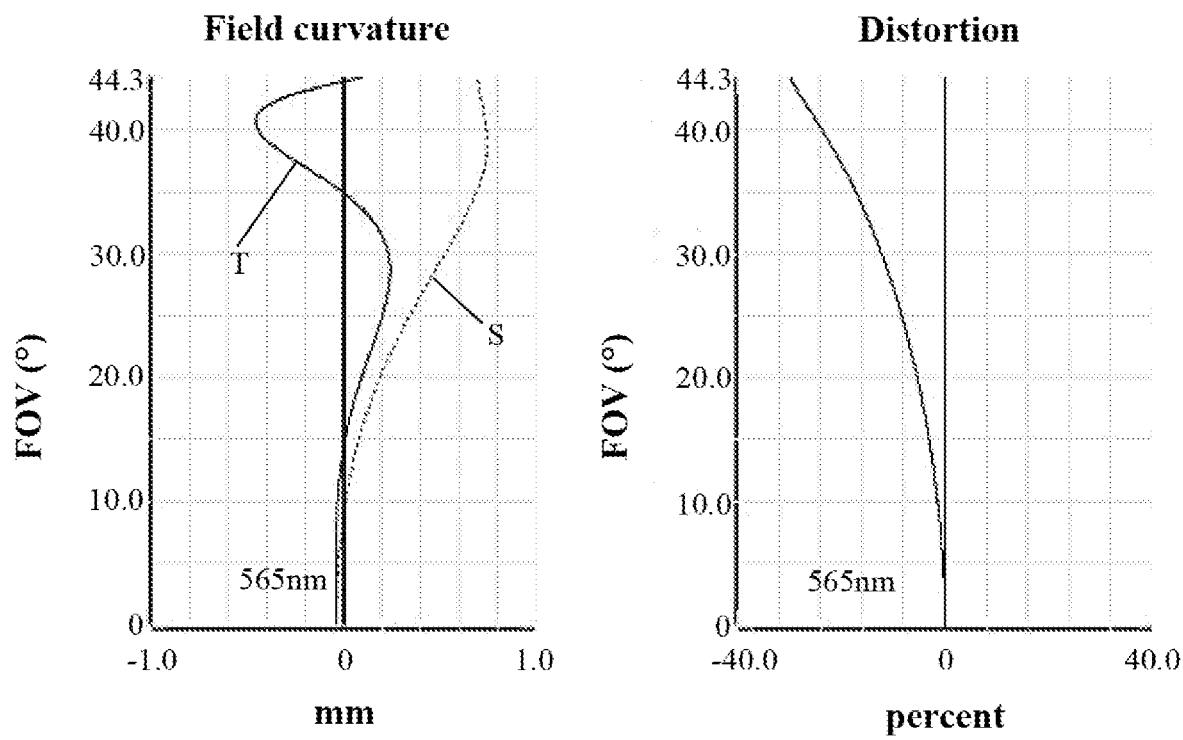
FIG. 9 is a schematic diagram of a field curvature and a distortion of the optical system shown in FIG. 6.

FIG. 7 and FIG. 8 illustrate a spot diagram and a lateral color diagram of lights having wavelengths of 550 nm, 555 nm, 560 nm, 565 nm, 570 nm, 575 nm and 580 nm after passing the optical system 20 according to Embodiment 2, respectively. FIG. 9 illustrates a field curvature and a distortion of a light having a wavelength of 565 nm after passing the optical system 20 according to Embodiment 2. A field curvature S in FIG. 9 is a field curvature in a sagittal direction, and T is a field curvature in a tangential direction.

In this embodiment, the focal length f1 of the first lens 17 is −985.238 mm, the focal length f2 of the second lens 15 is 17.983 mm, and the focal length f3 of the third lens 13 is −309.239 mm. An entrance pupil diameter ENPD of the optical system 20 is 4.000 mm. TTL is 13.477 mm. The maximum visible diameter VD is 16.00 mm. The maximum effective radius SDmax is 24.62 mm. The exit pupil distance L is 15.00 mm. The combined focal length f12 of the first lens 17 and the second lens 15 is 18.217 mm. The focal length f is 18.304 mm. f12/f is 0.995. TTL/f is 0.734. The optical distortion |DIST| is 29.90%. The chromatic aberration Lc is 26.52 am. The maximum value RM of the mean square root radius within the maximum visible diameter is 21.342 am. The chief ray angle CAR is 19.760. An image height IH of 1.0H is 12.500 mm, and an FOV (field of view) in the diagonal direction is 88.550. Thus, the optical system 20 satisfies the desire of design in a small size and the maximum visible diameter greater than or equal to 16.00 mm. Its on-axis and off-axis aberrations are fully corrected, thereby achieving excellent optical characteristics.

Embodiment 3

Figure 11:
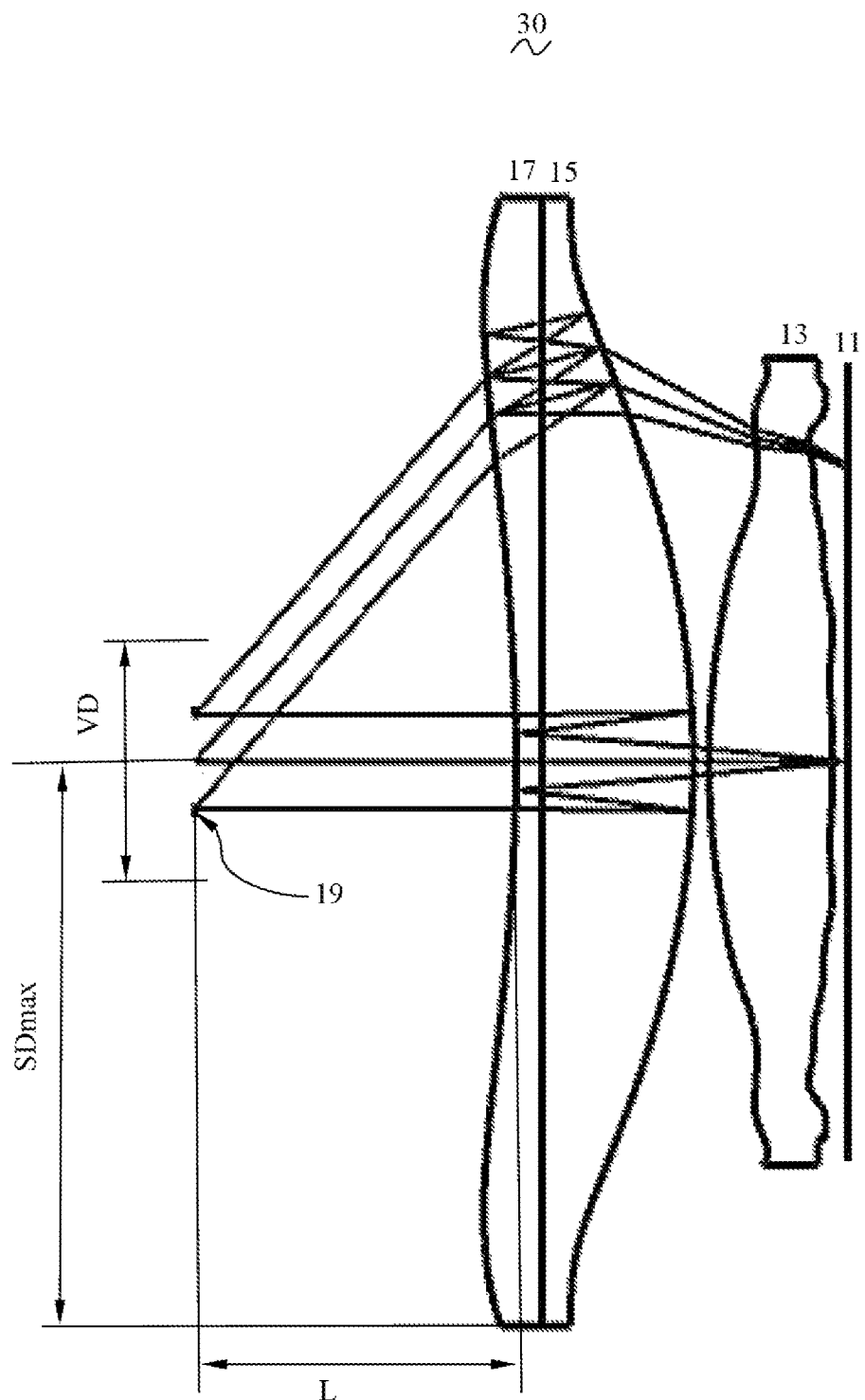
FIG. 11 is a schematic diagram of a structure of an optical system according to Embodiment 3 of the present disclosure.
Figure 15:
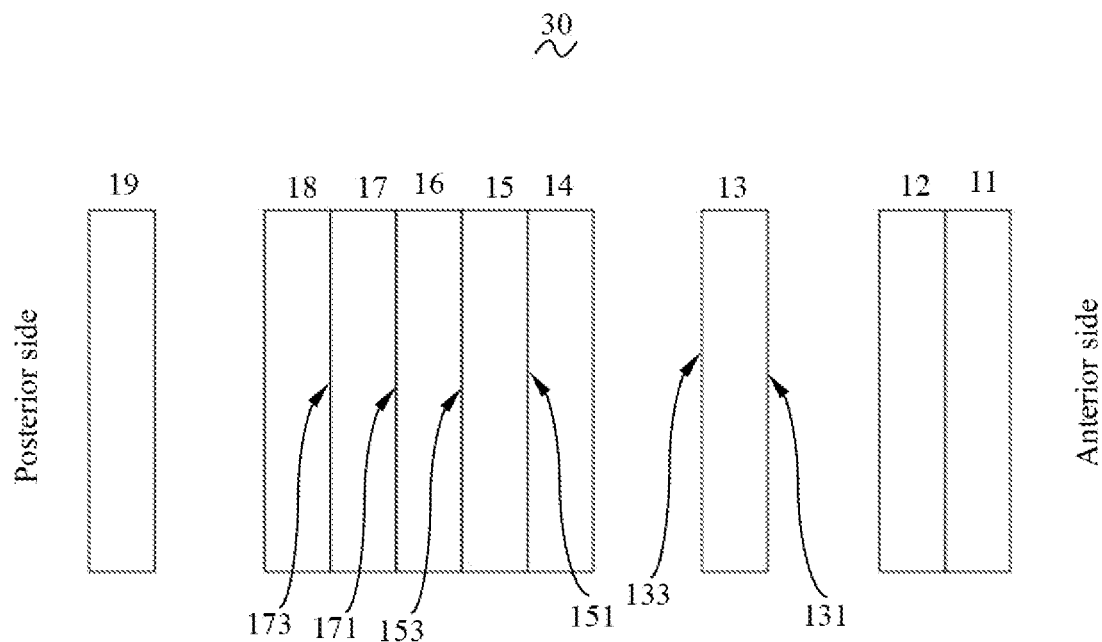
FIG. 15 is a schematic diagram of the optical system shown in FIG. 11 including a film structure.

FIG. 11 is shows an optical system 30 according to Embodiment 3 of the present disclosure. FIG. 15 is a schematic diagram of the optical system shown in FIG. 11 including a film structure. Embodiment 3 is basically the same as Embodiment 1 and involves symbols having the same meanings as Embodiment 1, and only differences therebetween will be described in the following.

In this embodiment, the posterior-side surface 133 of the third lens 13 is a convex surface.

Table 5 and Table 6 show design data of the optical system 30 in Embodiment 3 of the present disclosure.

TABLE 5

|  | R | d |  | nd |  | vd |
|---|---|---|---|---|---|---|
| Aperture | ∞ | d0= | 15.000 |  |  |  |
| R1 | −67.681 | d1= | 1.206 | n1 | 1.658 | v1 | 21.002678 |
| R2 | ∞ | d2= | 0.050 | n2 | 1.544 | v2 | 56.276843 |
| R3 | ∞ | d3= | 7.075 | n3 | 1.544 | v3 | 56.276843 |
| R4 | −34.231 | d4= | −7.075 | n3 | 1.544 | v3 | 56.276843 |
| R3 | ∞ | d5= | −0.050 | n2 | 1.544 | v2 | 56.276843 |
| R2 | ∞ | d6= | −1.206 | n1 | 1.658 | v1 | 21.002678 |
| R1 | −67.681 | d1= | 1.206 | n1 | 1.658 | v1 | 21.002678 |
| R2 | ∞ | d2= | 0.050 | n2 | 1.544 | v2 | 56.276843 |
| R3 | ∞ | d3= | 7.075 | n3 | 1.544 | v3 | 56.276843 |
| R4 | −34.231 | d7= | 0.730 |  |  |  |
| R5 | 26.524 | d8= | 5.774 | n4 | 1.658 | v4 | 21.002678 |
| R6 | −202.869 | d9= | 0.700 |  |  |  |
| Image Surface | ∞ |  |  |  |  |  |

Table 6 shows aspherical surface data of lenses in the optical system 30 in Embodiment 3 of the present disclosure.

TABLE 6

|  | Conic coefficient | Aspheric surface coefficients | | | | |
|---|---|---|---|---|---|---|
|  | k | A4 | A6 | A8 | A10 | A12 |
| R1 | −2.4304E+01 | 1.7278E+00 | 3.7675E−01 | 5.2577E−02 | −4.4679E−02 | 1.6236E−02 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8145E+00 | 3.9152E−01 | 5.5576E−01 | 1.5865E−01 | −4.2388E−02 | −2.5633E−02 |
| R3 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R1 | −2.4304E+01 | 1.7278E+00 | 3.7675E−01 | 5.2577E−02 | −4.4679E−02 | 1.6236E−02 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8145E+00 | 3.9152E−01 | 5.5576E−01 | 1.5865E−01 | −4.2388E−02 | −2.5633E−02 |
| R5 | −9.7117E+01 | 1.8071E+00 | −1.0105E+00 | 6.8960E−01 | −7.5698E−02 | −3.5568E−01 |
| R6 | 9.9000E+01 | −2.5033E−01 | 8.5804E−01 | 1.1287E−01 | −1.1033E−01 | −1.5083E−01 |

|  | Conic coefficient | Aspheric surface coefficients | | | | |
|---|---|---|---|---|---|---|
|  | k | A14 | A16 | A18 | A20 | A22 |
| R1 | −2.4304E+01 | −1.3515E−02 | 3.9362E−03 | −1.8229E−03 | 3.4060E−05 | 2.3557E−03 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8145E+00 | −1.6693E−02 | −4.7151E−03 | −5.5927E−04 | 1.0279E−03 | 5.5560E−04 |
| R3 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 |
| R1 | −2.4304E+01 | −1.3515E−02 | 3.9362E−03 | −1.8229E−03 | 3.4060E−05 | 2.3557E−03 |
| R2 | 0.0000E+00 | 0.0000E+00 | 0.0000E+00 | 0.0000E+00 | 0.0000E+00 | 0.0000E+00 |
| R3 | 0.0000E+00 | 0.0000E+00 | 0.0000E+00 | 0.0000E+00 | 0.0000E+00 | 0.0000E+00 |
| R4 | −2.8145E+00 | −1.6693E−02 | −4.7151E−03 | −5.5927E−04 | 1.0279E−03 | 5.5560E−04 |
| R5 | −9.7117E+01 | −1.2475E−01 | 7.4109E−02 | −9.7440E−03 | 1.6053E−02 | 4.3910E−02 |
| R6 | 9.9000E+01 | −1.9308E−01 | −9.9251E−03 | 7.3659E−02 | 1.2880E−01 | 2.0028E−01 |

TABLE 6-continued

|  | Conic coefficient k | Aspheric surface coefficients A24 |
|---|---|---|
| R1 | −2.4304E+01 | −5.2585E−04 |
| R2 | 0.0000E+00 | 0.0000E+00 |
| R3 | 0.0000E+00 | 0.0000E+00 |
| R4 | −2.8145E+00 | 1.7582E−03 |
| R3 | 0.0000E+00 | 0.0000E+00 |
| R2 | 0.0000E+00 | 0.0000E+00 |
| R1 | −2.4304E+01 | −5.2585E−04 |
| R2 | 0.0000E+00 | 0.0000E+00 |
| R3 | 0.0000E+00 | 0.0000E+00 |
| R4 | −2.8145E+00 | 1.7582E−03 |
| R5 | −9.7117E+01 | −2.7426E−02 |
| R6 | 9.9000E+01 | −1.8006E−01 |

Figure 12:
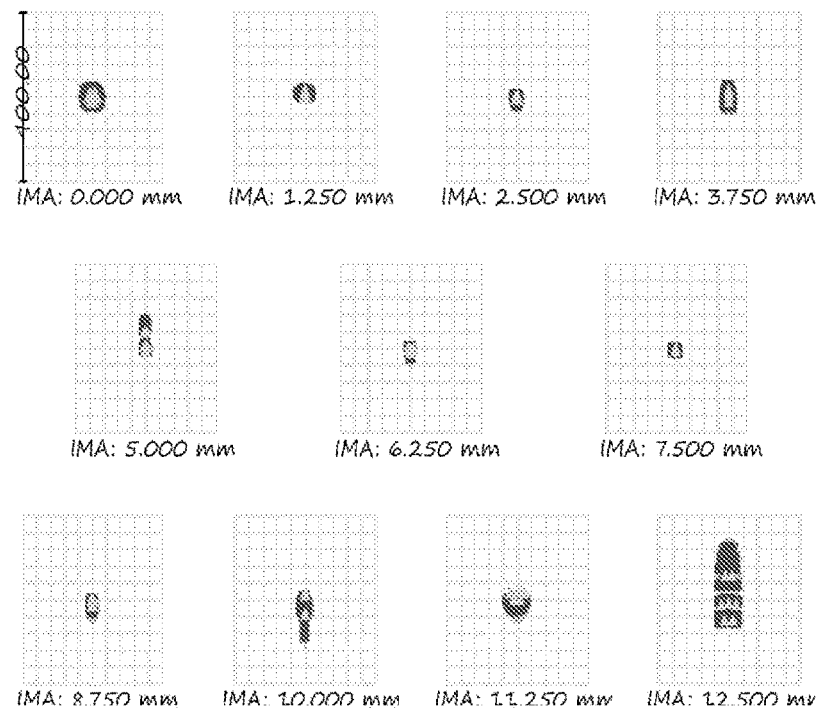
FIG. 12 is a spot diagram of the optical system shown in FIG. 11.
Figure 13:
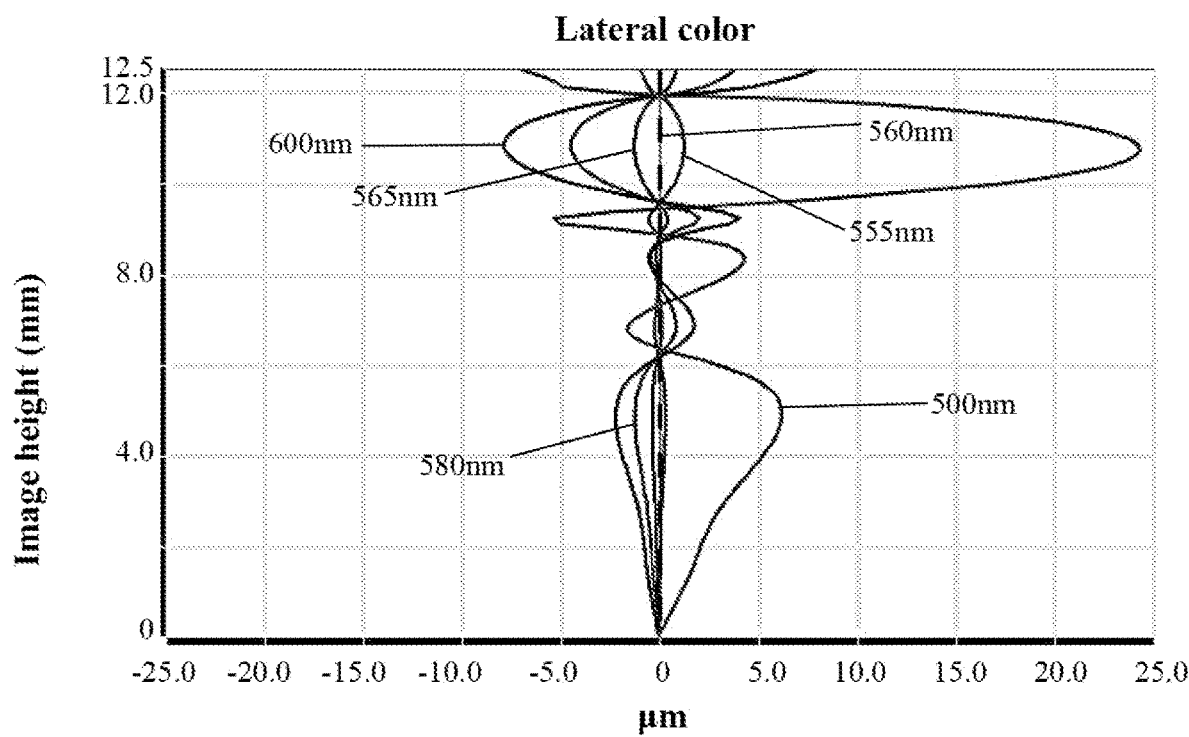
FIG. 13 is a schematic diagram of a lateral color of the optical system shown in FIG. 11.
Figure 14:
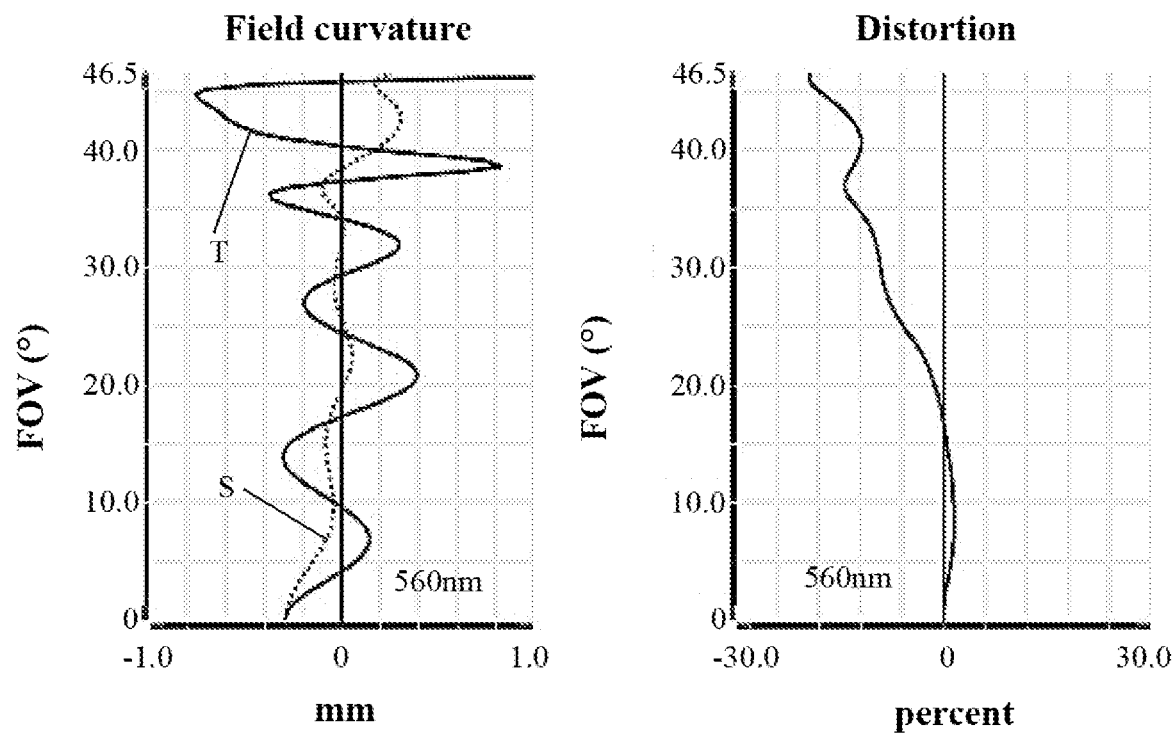
FIG. 14 is a schematic diagram of a field curvature and a distortion of the optical system shown in FIG. 11.

FIG. 12 and FIG. 13 illustrate a spot diagram and a lateral color diagram of lights having wavelengths of 500 nm, 555 nm, 560 nm, 565 nm, 580 nm and 600 nm after passing the optical system 30 according to Embodiment 3, respectively. FIG. 14 illustrates a field curvature and a distortion of a light having a wavelength of 560 nm after passing the optical system 30 according to Embodiment 3. A field curvature S in FIG. 14 is a field curvature in a sagittal direction, and T is a field curvature in a tangential direction.

In this embodiment, the focal length f1 of the first lens 17 is −102.156 mm, the focal length f2 of the second lens 15 is 11.074 mm, and the focal length f3 of the third lens 13 is 35.764 mm. An entrance pupil diameter ENPD of the optical system 30 is 4.000 mm. TTL is 14.835 mm. The maximum visible diameter VD is 16.00 mm. The maximum effective radius SDmax is 24.00 mm. The exit pupil distance L is 15.00 mm. The combined focal length f12 of the first lens 17 and the second lens 15 is 11.737 mm. The focal length f is 14.888 mm. f12/f is 0.662. TTL/f is 0.993. The optical distortion |DIST| is 19.30%. The chromatic aberration Lc is 22.40 µm. The maximum value RM of the mean square root radius within the maximum visible diameter is 22.323 µm. The chief ray angle CAR is 24.90°. An image height IH of 1.0H is 12.500 mm, and an FOV (field of view) in the diagonal direction is 93.07°. Thus, the optical system 30 satisfies the desire of design in a small size and the maximum visible diameter greater than or equal to 16.00 mm. Its on-axis and off-axis aberrations are fully corrected, thereby achieving excellent optical characteristics.

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. An optical system comprising, from an anterior side to a posterior side: an image surface to emit light, a circular polarizer; a third lens, a beam splitter, a second lens, a quarter waveplate, a first lens, a reflective polarizing film and an aperture, wherein the circular polarizer is attached to a posterior side of the image surface, the beam splitter is attached to an anterior-side surface of the second lens, the first lens and the second lens are glued together, the quarter waveplate is provided between the first lens and the second lens, the reflective polarizing film is attached to a posterior-side surface of the first lens, and the optical system satisfies following conditions:

VD≥16.00 mm, SDmax≤30.00 mm, L≤15.00 mm and f12/f≤1.00;

where

VD denotes a maximum visible diameter of the optical system,

SDmax denotes a maximum effective radius of each lens in the optical system,

L denotes an exit pupil distance of the optical system, f12 denotes a combined focal length of the first lens and the second lens, and f denotes a focal length of the optical system.

2. The optical system according to claim 1, wherein a gluing surface of the first lens and the second lens is a plane surface.

3. The optical system according to claim 1, wherein all of the posterior-side surface of the first lens, the anterior-side surface of the second lens, an anterior-side surface of the third lens and a posterior-side surface of the third lens are aspherical surfaces.

4. The optical system according to claim 1, wherein the beam splitter is a transflective film, and the optical system satisfies following condition:

$$45.00\% \leq X \leq 65.00\%;$$

where

X denotes a reflective rate.

5. The optical system according to claim 1, satisfying following condition:

$$85.00° \leq FOV \leq 95.00°;$$

where

FOV denotes a field of view of the optical system.

6. The optical system according to claim 1, satisfying following condition:

$$TTL \leq 15.00 \text{ mm};$$

where

TTL denotes an on-axis distance from an anterior-side surface of the third lens to the posterior-side surface of the first lens.

7. The optical system according to claim 1, wherein a transmissive rate of a transmissive axis of the reflective polarizing film is greater than or equal to 91.00%, while a reflective rate of a reflective axis of the reflective polarizing film is greater than or equal to 98.00%.

8. The optical system according to claim 1, satisfying following condition:

$$|DIST| \leq 30.00\%;$$

where
DIST denotes an optical distortion of the optical system.

9. The optical system according to claim 1, satisfying following condition:

$$Lc \leq 30.00 \ \mu m;$$

where
Lc denotes a chromatic aberration of the optical system.

10. The optical system according to claim 1, satisfying following condition:

$$RM \leq 30.00 \ \mu m;$$

where
RM denotes a maximum value of a mean square root radius within a maximum visible diameter.

11. The optical system according to claim 1, satisfying following condition:

$$CAR \leq 25.00°;$$

where
CAR denotes a chief ray angle of the optical system.

12. The optical system according to claim 1, satisfying following condition:

$$TTL/f \leq 1.00;$$

where
TTL denotes an on-axis distance from an anterior-side surface of the third lens to the posterior-side surface of the first lens; and
f denotes a focal length of the optical system.

13. The optical system according to claim 1, wherein the image surface is a display having a size of 1.3 inches.

* * * * *